May 18, 1926.
M. L. ARNOLD
1,584,968
FOOT WIPER FOR AUTOMOBILES
Filed Feb. 11, 1925
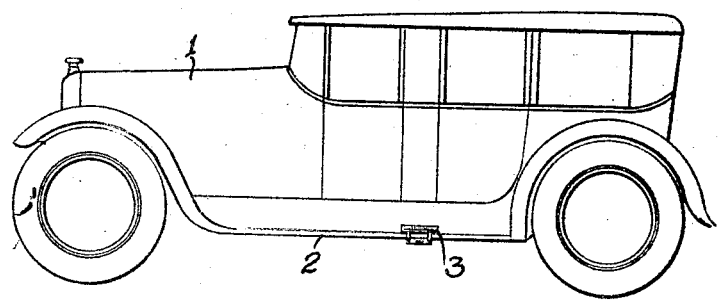
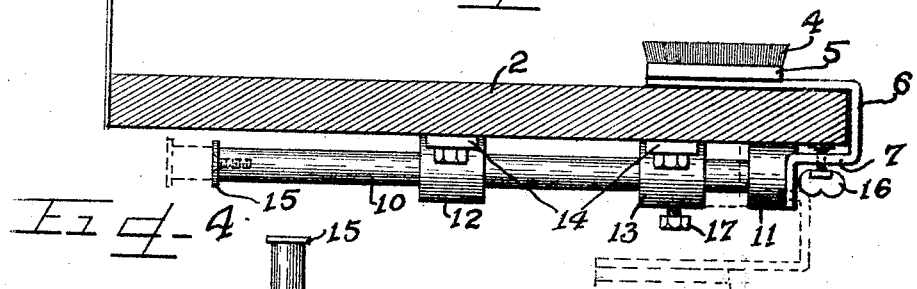
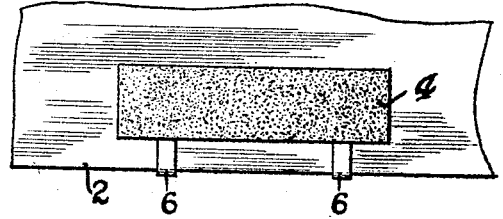
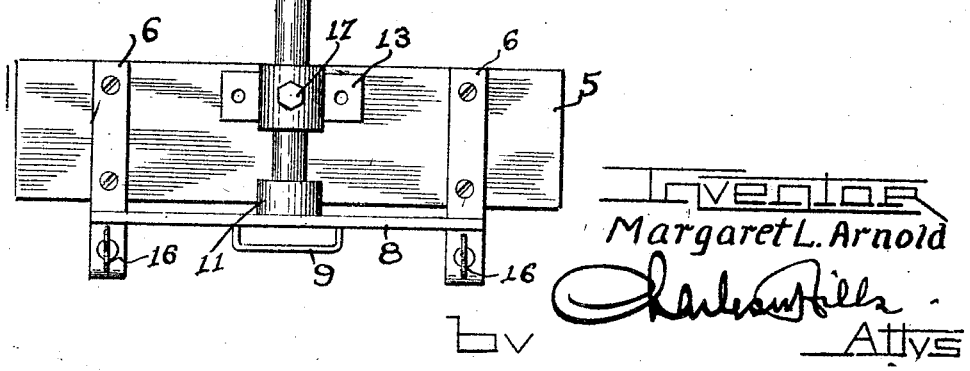
Inventor
Margaret L. Arnold
by
Attys Patented May 18, 1926.

1,584,968

UNITED STATES PATENT OFFICE.

MARGARET L. ARNOLD, OF CHICAGO, ILLINOIS.

FOOT WIPER FOR AUTOMOBILES.

Application filed February 11, 1925. Serial No. 8,359.

This invention relates to a foot wiper to be used in combination with the running board of an automobile.

It is well known that in wet and stormy weather one usually carries on his shoes a good deal of mud or soil when stepping into an automobile, consequently soiling the interior of the car.

This invention has for its object a foot wiper for use on automobiles that can be secured in position on the upper side of the running board for use, or when not in use can be easily and quickly concealed beneath the running board.

With these and other objects in view which will become more apparent in the following description and disclosures in the drawings, this invention comprises the novel mechanisms and combinations hereinafter described and more particularly pointed out and defined in the appended claims.

In the accompanying drawings, which illustrate a preferred embodiment of this invention and in which similar reference numerals refer to similar features in the different views:

Figure 1 is an elevational view of an automobile showing the foot wiper in position for use.

Figure 2 is an enlarged fragmentary top plan view of the running board with my foot wiper in operative position.

Figure 3 is an enlarged transverse section of the running board showing the foot wiping device in normal position and in dotted lines in concealed position.

Figure 4 is an enlarged bottom plan view of the foot wiping device removed from the running board.

As shown on the drawings:

In Figure 1, reference numeral 1 indicates an automobile having a running board 2 on which is fastened the foot wiping device 3. The latter consists of a brush or mat 4 secured on a plate 5. To said plate are attached, on the under side, spaced straps 6, which rest on the running board and extend to the edge of the running board, where they are bent downward, then rearwardly as at 7. A cross bar 8 having a handle 9 connects the ends of said straps, and is secured to the cylindrical rod 10 at its enlarged end 11. The rod 10 is slidably and revolubly mounted in the bearing brackets 12 and 13, which are secured to the under side of the running board by bolts 14. On the free end of the rod 10 is a stop member 15 to prevent said rod from pulling through the bearing 12. Through the portions 7 of the straps 6 extend clamping screws 16 to hold the straps from rattling against the running board. In the bearing 13 is a set screw 17 for engagement with the rod 10 to prevent sliding or rotating movement of said rod when the foot wiping device is in the desired position.

When the foot wiper is not desired on the running board it may be placed in concealed position underneath the running board. To do this the clamping screws 16 and the set screw 17 are loosened, the rod 10 is pulled outwardly until the brush 4 clears the edge of the running board; then the brush is turned into inverted position and pushed back until the enlarged end 11 abuts the bearing 13. The set screw 17 is finally tightened and the device thereby secured against movement. The brush wiper cannot be entirely removed, as by theft, carelessness, or joggling on account of the stop member 15.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In combination with a running board of an automobile, a rod slidingly and revolubly mounted on the under side of said running board, straps connected to said rod and adapted to extend over the edge of said running board, a foot mat on the top of the running board connected to said straps, said rod being slidable and rotatable for concealing said mat in inverted position below the running board.

2. In combination with a running board of an automobile, a foot wiper device comprising a foot mat, a pair of straps secured to said mat, a cross bar connecting the ends of said straps, a rod slidably and revolubly supported on the under side of the running board, said rod being secured to said cross bar, and means for securing said straps to the running board.

3. In combination with a running board of an automobile, a foot wiper, a rod slidably and revolubly mounted on the under side of the running board, straps securing said foot wiper to said rod, and means for holding said foot wiper in normal position on the running board and means for holding said foot wiper in concealed inverted position beneath the running board.

4. In combination with the running board of an automobile, a foot wiping device comprising a foot mat, a pair of straps secured thereto and bent to fit around the edge of the running board, a cross bar joining the ends of said straps, a cylindrical rod secured to said cross bar, said rod being slidably and revolubly mounted on the under side of the running board, means for securing said straps to the under side of the running board, and a handle on said cross bar for drawing said wiping device outwardly to change said foot mat from normal position on the upper side of the running board to concealed position on the under side of the running board.

In testimony whereof I have hereunto subscribed my name.

MARGARET L. ARNOLD.